(12) United States Patent
Akiyama

(10) Patent No.: US 9,568,817 B2
(45) Date of Patent: Feb. 14, 2017

(54) ILLUMINATION APPARATUS AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/830,285

(22) Filed: Aug. 19, 2015

(65) Prior Publication Data

US 2016/0062223 A1    Mar. 3, 2016

(30) Foreign Application Priority Data

Aug. 29, 2014    (JP) ................................ 2014-175470

(51) Int. Cl.
*G03B 21/20*    (2006.01)
*H04N 9/31*    (2006.01)

(52) U.S. Cl.
CPC .......... *G03B 21/208* (2013.01); *G03B 21/204* (2013.01); *G03B 21/2013* (2013.01); *G03B 21/2066* (2013.01); *H04N 9/3152* (2013.01); *H04N 9/3164* (2013.01)

(58) Field of Classification Search
CPC .............. G03B 21/204; G03B 21/2013; G03B 21/2033; G03B 21/206; G03B 21/208; G03B 27/0922; H04N 9/3161; H04N 9/3164; H04N 9/3152; H04N 9/317
See application file for complete search history.

(56) References Cited

U.S. PATENT DOCUMENTS

| 2012/0133904 A1* | 5/2012 | Akiyama | G02B 27/102 353/38 |
| 2012/0140183 A1* | 6/2012 | Tanaka | G03B 21/28 353/20 |
| 2014/0268063 A1* | 9/2014 | Akiyama | G03B 21/204 353/20 |
| 2015/0301438 A1* | 10/2015 | Akiyama | G03B 21/208 353/20 |

FOREIGN PATENT DOCUMENTS

| JP | 2012-118110 A | 6/2012 |
| JP | 2012-118302 A | 6/2012 |
| JP | 2012-123948 A | 6/2012 |
| JP | 2013-114980 A | 6/2013 |

* cited by examiner

*Primary Examiner* — William C Dowling
*Assistant Examiner* — Ryan Howard
(74) *Attorney, Agent, or Firm* — Oliff PLC

(57) ABSTRACT

An illumination apparatus includes a light source apparatus that outputs first, second, and third light beams, an afocal system on which the first, second, and third light beams are incident, a first fly-eye lens, a second fly-eye lens, a light convergence system provided in a position downstream of the second fly-eye lens, and a phosphor layer that the first light beam, the second light beam, and the third light beam enter via the light convergence system. When a ratio between the distance between the first light beam and the second light beam and the distance between the first light beam and the third light beam is defined as a ratio R, the ratio R on the light exiting side of the afocal system differs from the ratio R on the light incident side of the afocal system.

2 Claims, 5 Drawing Sheets

ILLUMINATION APPARATUS AND PROJECTOR

BACKGROUND

1. Technical Field

The present invention relates to an illumination apparatus and a projector.

2. Related Art

In recent years, a projector uses a light source apparatus using phosphor (see JP-A-2012-118302, for example). In the light source apparatus, a homogenizer is used to homogeneously irradiate a phosphor layer with excitation light.

Even in the related art described above, however, the homogeneity of the excitation light is insufficient, and it is therefore difficult to produce fluorescence having a highly homogenous intensity distribution, and provision of a new technology is desired.

SUMMARY

An advantage of some aspects of the invention relates to provide an illumination apparatus and a projector capable of producing fluorescence having a highly homogeneous intensity distribution.

A first aspect of the invention provides an illumination apparatus including a light source apparatus that outputs a first light beam, a second light beam, and a third light beam, an afocal system on which the first light beam, the second light beam, and the third light beam are incident, a first fly-eye lens provided in a position downstream of the afocal system, a second fly-eye lens provided in a position downstream of the first fly-eye lens, a light convergence system provided in a position downstream of the second fly-eye lens, and a phosphor layer which is provided in a position downstream of the light convergence system and on which the first light beam, the second light beam, and the third light beam are incident via the light convergence system, and a ratio R is defined to be the ratio between the distance between the first light beam and the second light beam to the distance between the first light beam and the third light beam, in which the afocal system is so configured that the ratio R on the light exiting side of the afocal system differs from the ratio R on the light incident side of the afocal system.

In the illumination apparatus according to the first aspect, spots formed on the phosphor layer by the first light beam, the second light beam, and the third light beam are located in appropriately dispersed positions, whereby the homogeneity of the illuminance distribution on the phosphor layer increases. Fluorescence having a highly homogenous intensity distribution can thus be produced.

In the first aspect described above, it is preferable that the afocal system includes a convex lens having an aspherical surface.

According to the configuration, an aberration produced by the aspherical surface can appropriately change the optical paths of the first light beam and the second light beam.

A second aspect of the invention provides a projector including an illumination apparatus that outputs illumination light, a light modulator that modulates the illumination light in accordance with image information to form image light, and a projection system that projects the image light, in which the illumination apparatus is the illumination apparatus according to the first aspect described above.

The projector according to the second aspect, which includes the illumination apparatus according to the first aspect described above, can perform display with excellent image quality because the projector itself also outputs fluorescence having increased homogeneity of the intensity distribution.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
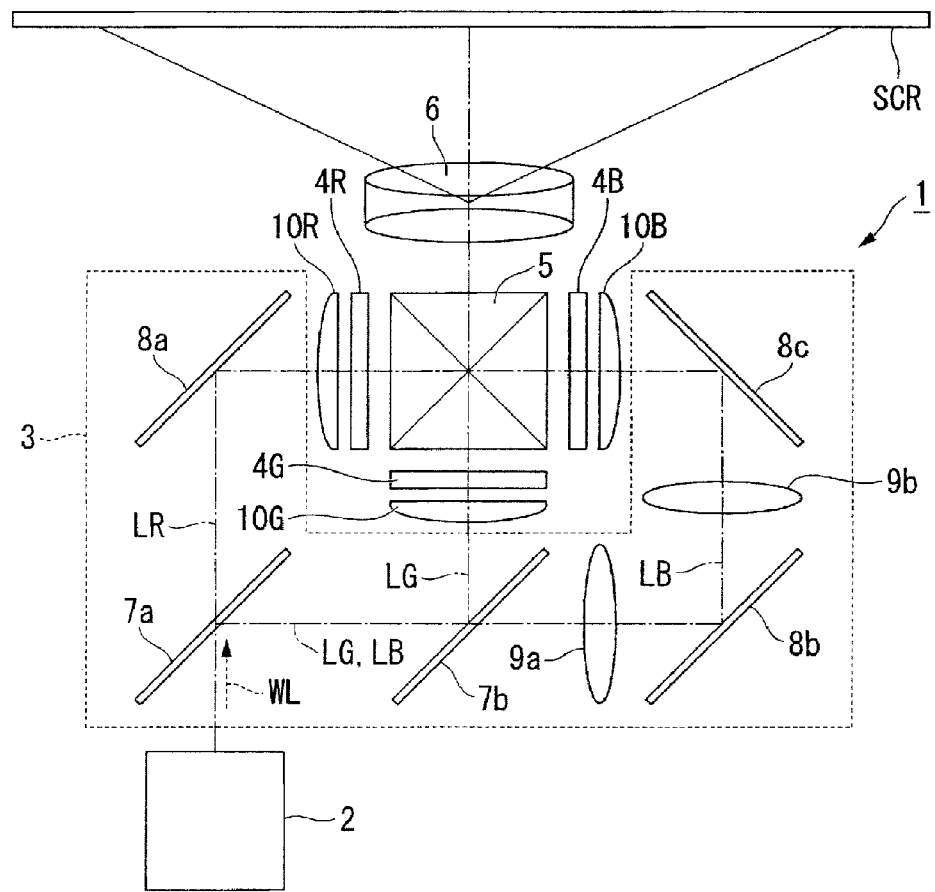
FIG. 1 is a plan view showing a schematic configuration of a projector according to an embodiment of the invention.

An embodiment of the invention will be described below in detail with reference to the drawings.

In the drawings used in the following description, a characteristic portion is enlarged in some cases for easy understanding of the characteristic, and the dimension ratio and other factors of each component is not necessarily equal to actual values.

An example of a projector according to the present embodiment will first be described. The projector according to the present embodiment is a projection-type image display apparatus that displays color video images (still images) on a screen (projection surface) SCR. A projector 1 uses three light modulators corresponding red light, green light, and blue light. The projector uses, as a light source in an illumination apparatus, a semiconductor laser (laser light source) capable of producing high-luminance, high-intensity light.

Projector

FIG. 1 is a plan view showing a schematic configuration of the projector according to the present embodiment. The projector 1 includes an illumination apparatus 2, a color separation system 3, a light modulator 4R, a light modulator 4G, a light modulator 4B, a light combining system 5, and a projection system 6, as shown in FIG. 1.

The color separation system 3 separates illumination light WL into red light LR, green light LG, and blue light LB. The color separation system 3 generally includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a has a function of separating the illumination light WL from the illumination apparatus 2 into the red light LR and the other light beams (green light LG and blue light LB). The first dichroic mirror 7a transmits the separated red light LR and reflects the other light beams (green light LG and blue light LB). On the other hand, the second dichroic mirror 7b has a function of separating the other light beams into the green light LG and blue light LB.

The second dichroic mirror 7b reflects the separated green light LG and transmits the blue light LB.

The first total reflection mirror 8a is disposed on the optical path of the red light LR and reflects the red light LR having passed through the first dichroic mirror 7a toward the light modulator 4R. On the other hand, the second total reflection mirror 8b and the third total reflection mirror 8c are disposed on the optical path of the blue light LB and guide the blue light LB having passed through the second dichroic mirror 7b to the light modulator 4B. The green light LG is reflected off the second dichroic mirror 7b toward the light modulator 4G.

The first relay lens 9a and the second relay lens 9b are disposed on the optical path of the blue light LB and on the light exiting side of the second dichroic mirror 7b. The first relay lens 9a and the second relay lens 9b have a function of compensating light loss of the blue light LB due to the optical path length of the blue light LB being longer than the optical path lengths of the red light LR and the green light LG.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

Each of the light modulators 4R, 4G, and 4B is formed, for example, of a transmissive liquid crystal panel. A pair of polarizers (not shown) are disposed on the light incident side and the light exiting side of each of the liquid crystal panels and transmit only linearly polarized light polarized in a specific direction.

Further, a field lens 10R, a field lens 10G, and a field lens 10B are disposed on the light incident side of the light modulator 4R, the light modulator 4G, and the light modulator 4B, respectively. The field lens 10R, the field lens 10G, and the field lens 10B parallelize the red light LR, the green light LG, and the blue light LB to be incident on the light modulator 4R, the light modulator 4G, and the light modulator 4B, respectively.

The image light from each of the light modulators 4R, 4G, and 4B is incident on the light combining system 5. The light combining system 5 combines the image light fluxes corresponding to the red light LR, the green light LG, and the blue light LB with one another and outputs the combined image light toward the projection system 6. The light combining system 5 is formed, for example, of a cross dichroic prism.

The projection system 6 is formed of a group of projection lenses and enlarges the combined image light from the light combining system 5 and projects the enlarged image light toward the screen SCR. Enlarged color video images are thus displayed on the screen SCR.

Illumination Apparatus

Figure 2:
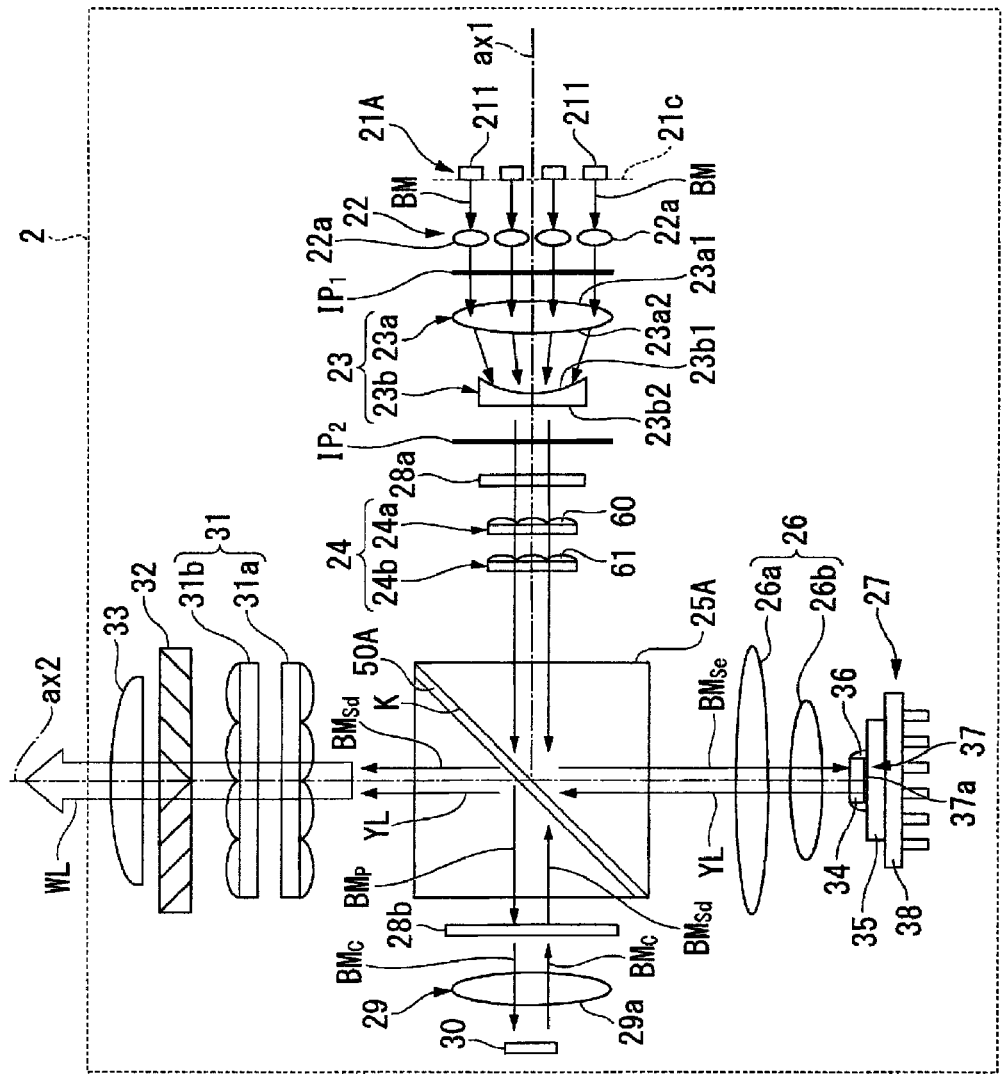
FIG. 2 is a plan view showing a schematic configuration of an illumination apparatus in the present embodiment.

The illumination apparatus 2 according to an embodiment of the invention will subsequently be described. FIG. 2 shows a schematic configuration of the illumination apparatus 2. The illumination apparatus 2 includes an array light source 21A, a collimator system 22, an afocal system 23, a homogenizer system 24, an optical element 25A including a polarization separation element 50A, a first pickup system 26, a fluorescence emitting element 27, a retardation film 28b, a second pickup system 29, a reflective diffusion element 30, an optical integration system 31, a polarization conversion element 32, and a superimposing system 33, as shown in FIG. 2.

The array light source 21A, the collimator system 22, the afocal system 23, the homogenizer system 24, the optical element 25A, the retardation film 28b, the second pickup system 29, and the reflective diffusion element 30 are sequentially arranged along an optical axis ax1 shown in FIG. 2 with the optical centers of the optical components described above located along the optical axis ax1. On the other hand, the fluorescence emitting element 27, the first pickup system 26, the optical element 25A, the optical integration system 31, the polarization conversion element 32, and the superimposing system 33 are sequentially arranged along an optical axis ax2. The optical axis ax1 and the optical axis ax2 are present in the same plane and perpendicular to each other.

The array light source 21A corresponds to a light source apparatus in the present invention. The array light source 21A includes a plurality of semiconductor lasers 211. The plurality of semiconductor lasers 211 are arranged in an array in a plane perpendicular to the optical axis ax1.

Each of the semiconductor lasers 211 emits a light beam BM formed of blue light. The semiconductor laser 211 emits the blue light in the form of laser light, for example, having a peak wavelength of 460 nm. The light beam BM is linearly polarized light.

The light beams BM are emitted from the array light source 21A toward the polarization separation element 50A. Part of the light beams BM is separated by the polarization separation element 50A and forms excitation light, and the other part forms blue light for image display, as will be described later.

The light beams BM emitted from the array light source 21A are incident on the collimator system 22. The collimator system 22 converts the light beams BM into parallelized light fluxes. The collimator system 22 is formed of a plurality of collimator lenses 22a arranged in an array. The plurality of collimator lenses 22a is disposed in correspondence with the plurality of semiconductor lasers 211.

The light beams BM having passed through the collimator system 22 and having therefore been converted into parallelized light fluxes are incident on the afocal system 23. The afocal system 23 is formed, for example, of a convex lens 23a and a concave lens 23b. The convex lens 23a has a light incident surface 23a1 and a light exiting surface 23a2. The concave lens has a light incident surface 23b1 and a light exiting surface 23b2.

The light beams BM having passed through the afocal system 23 further pass through a quarter wave plate 28a, which converts the light beams BM into circularly polarized light fluxes.

The light beams BM having passed through the quarter wave plate 28a are incident on the homogenizer system 24. In the present embodiment, the homogenizer system 24 includes, for example, a first fly-eye lens 24a and a second fly-eye lens 24b. The second fly-eye lens 24b is provided on the light exiting side of the first fly-eye lens 24a. The first fly-eye lens 24a includes, for example, a plurality of lenslets 60 arranged in a matrix. The second fly-eye lens 24b has the same configuration as that of the first fly-eye lens 24a and includes a plurality of lenslets 61 arranged in a matrix.

The homogenizer system 24 cooperates with the first pickup system 26, which will be described later, to cause a plurality of narrow light fluxes having exited out of the plurality of lenslets 61 to be superimposed on one another on a phosphor layer 34. As a result, the excitation light with which the phosphor layer 34 is irradiated has a homogenous light intensity distribution (what is called top-hat distribution).

The light beams BM having passed through the homogenizer system 24 are incident on the optical element 25A. The optical element 25A is formed, for example, of a wavelength selective dichroic prism. The dichroic prism has an inclined surface K inclined to the optical axis ax1 by 45°. The inclined surface K is also inclined to the optical axis ax2 by 45°.

The polarization separation element 50A is provided on the inclined surface K. The polarization separation element 50A separates the circularly polarized light beams BM into light beams $BM_{Se}$ of an S-polarization component with respect to the polarization separation element 50A, and light beams $BM_P$ of a P-polarization component with respect to the polarization separation element 50A. The light beams $BM_{Se}$ are reflected, as excitation light, off the polarization separation element 50A toward the fluorescence emitting element 27. The light beams $BM_P$ pass through the polarization separation element 50A toward the reflective diffusion element 30.

The polarization separation element 50A further has a color separation function of transmitting fluorescence YL, which belongs to a wavelength band different from the wavelength band to which the blue light belongs, irrespective of the polarization state of the fluorescence YL.

The light beams $BM_{Se}$ reflected off the polarization separation element 50A are incident on the first pickup system 26.

The first pickup system 26 is formed, for example, of a pickup lens 26a and a pickup lens 26b. The first pickup system 26 causes the narrow light fluxes having exited out of the plurality of lenslets 61 to converge toward the phosphor layer 34 and superimposes the light fluxes on one another on the phosphor layer 34. The first pickup system 26 corresponds to the "light convergence system" in the appended claims.

The fluorescence emitting element 27 includes the phosphor layer 34, a substrate 35, which supports the phosphor layer 34, and a fixing member 36, which fixes the phosphor layer 34 to the substrate 35. The phosphor layer 34 is fixed to the substrate 35 by the fixing member 36.

The phosphor layer 34 contains a phosphor excited by the excitation light (light beams $BM_{Se}$) having the wavelength of 460 nm, and the phosphor produces the fluorescence (yellow light) YL having a peak wavelength in a wavelength region, for example, from 500 to 700 nm.

The phosphor layer 34 is preferably made of a material that excels in heat resistance and surface processability. A phosphor layer in which phosphor particles are dispersed in alumina or any other inorganic binders or a phosphor layer in which phosphor particles are sintered with no binder can be preferably used as the phosphor layer 34.

A reflector 37 is provided on the side of the phosphor layer 34 opposite the side on which the excitation light is incident. The reflector 37 has a function of reflecting the fluorescence YL produced by the phosphor layer 34.

A heat sink 38 is disposed on the surface of the substrate 35 opposite the surface that supports the phosphor layer 34.

Part of the fluorescence YL produced by the phosphor layer 34 is reflected off the reflector 37 and exits out of the phosphor layer 34. The other part of the fluorescence YL produced by the phosphor layer 34 is not reflected off the reflector 37 but directly exits out of the phosphor layer 34. The fluorescence YL thus exits out of the phosphor layer 34. In the present embodiment, the fluorescence emitting element 27 is irradiated with excitation light having a homogeneous intensity distribution, as will be described later, whereby the fluorescence YL can be efficiently produced.

The fluorescence YL having exited out of the phosphor layer 34 is non-polarized light having polarization directions that are not aligned with each other. The fluorescence YL passes through the first pickup system 26 and is then incident on the polarization separation element 50A. The polarization separation element 50A then transmits the fluorescence YL toward the optical integration system 31.

On the other hand, the p-polarized light beams $BM_P$ having exited out of the polarization separation element 50A are incident on the retardation film 28b. The retardation film 28b is a quarter wave plate (λ/4 plate) disposed on the optical path between the polarization separation element 50A and the reflective diffusion element 30. The light beams $BM_P$ having exited out of the polarization separation element 50A are converted by the retardation film 28b into circularly polarized light beams $BM_C$ and then incident on the second pickup system 29.

The second pickup system 29 causes the light beams $BM_C$ to converge toward the reflective diffusion element 30 and is formed, for example, of a pickup lens 29a.

The reflective diffusion element 30 diffuses and reflects the light beams $BM_C$ having exited out of the second pickup system 29 toward the polarization separation element 50A. Among a variety of types of reflective diffusion elements, the reflective diffusion element 30 is preferably capable of Lambertian reflection of the light beams $BM_C$ incident on the reflective diffusion element 30.

The light beam $BM_C$ diffused by and reflected off the reflective diffusion element 30 is incident on the retardation film 28b again, which converts the light beams $BM_C$ into S-polarized light beams $BM_{Sd}$, which are then incident on the polarization separation element 50A. The light beams $BM_{Sd}$ are then reflected off the polarization separation element 50A toward the optical integration system 31.

As a result, the light beams $BM_{Sd}$, each of which is blue light, are used along with the fluorescence YL, which has passed through the polarization separation element 50A, as the illumination light WL. That is, the light beams $BM_{Sd}$ and the fluorescence YL exit out of the polarization separation element 50A in the same direction. The illumination light WL, which is the combination of the light beams $BM_{Sd}$, each of which is blue light, and the fluorescence YL, which is yellow light, is thus produced as white light.

The illumination light WL having exited out of the polarization separation element 50A is incident on the optical integration system 31. The optical integration system 31 is formed, for example, of a lens array 31a and a lens array 31b. Each of the lens arrays 31a and 31b is formed of a plurality of lenses arranged in an array.

The illumination light WL having passed through the optical integration system 31 is incident on the polarization conversion element 32. The polarization conversion element 32 is formed of a polarization separation film and a retardation film. The polarization conversion element 32 converts the fluorescence YL, which is non-polarized light, into S-polarized light.

The illumination light WL having been converted by the polarization conversion element 32 into S-polarized light is incident on the superimposing system 33. The superimposing system 33 superimposes the illumination light fluxes WL having exited out of the polarization conversion element 32 on one another in an illuminated area. The superimposing system 33 is formed, for example, of a superimposing lens 33a. The illuminance distribution in the illuminated area is thus homogenized.

In the present embodiment, a ratio R is defined to be a ratio of the distance between a first light beam and a second light beam and the distance between the first light beam and a third light beam, and the afocal system 23 is so configured that the ratio R on the light exiting side of the afocal system 23 differs from the ratio R on the light incident side of the afocal system 23. For example, the configuration described above is achieved by adding an aberration for homogenization to the afocal system 23. Specifically, an aberration for homogenization is added to the afocal system 23 by forming at least one of the light incident surface 23a1 and the light exiting surface 23a2 with an aspherical surface. An aberration for homogenization may instead be added to the afocal system 23 by forming at least one of the light incident surface 23b1 and the light exiting surface 23b2 with an aspherical surface.

The present embodiment will be described in detail with reference to FIGS. 3, 4, and 5 in which imaginary planes IP1 and IP2 are set. The imaginary plane IP1 is an imaginary plane perpendicular to the optical axis ax1 and set on the light incident side of the afocal system 23, and the imaginary plane IP2 is an imaginary plane perpendicular to the optical axis ax1 and set on the light exiting side of the afocal system 23.

Figure 3:
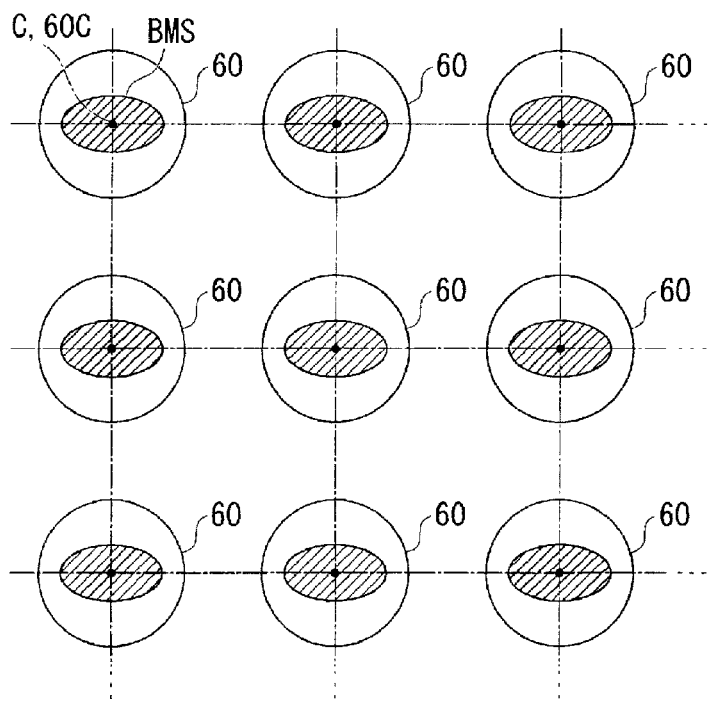
FIG. 3 shows the arrangement of light beams in an imaginary plane in a case where no aberration for homogenization is added to an afocal system as a comparative example.

FIG. 3 shows the arrangement of the light beams BM in the imaginary plane IP2 in a case where no aberration for homogenization is added to the afocal system 23 as a comparative example. In FIG. 3, the imaginary plane IP2 is viewed along the optical axis ax1. The present comparative example differs from the present embodiment only in that no aberration for homogenization is added to the afocal system 23 and the other configurations are the same. Reference characters BMS and C denote the spot and the incident position (beam center) of the light beams BM in the imaginary plane IP2, respectively. In FIG. 3, the first fly-eye lens 24a is so drawn that it is superimposed on the light beams BM. It is noted that the contour of each of the lenslets 60 is actually rectangular but shown in a circle for ease of illustration. Further, reference character 60C denotes the lens optical axis of each of the lenslets 60.

In the comparative example, in each of the light beams BM, the light incident position C of the light beam BM coincides with the corresponding lens optical axis 60C, as shown in FIG. 3.

Figure 4:
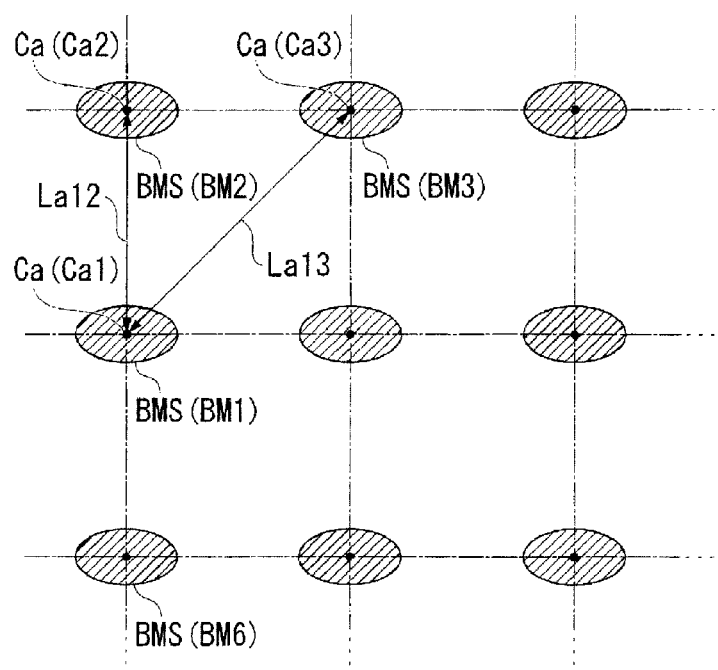
FIG. 4 shows another imaginary plane viewed along an optical axis.

FIG. 4 shows the imaginary plane IP1 viewed along the optical axis ax1.

It is assumed that nine semiconductor lasers 211 are arranged in a three-row, three-column regular matrix for convenience, and that the principal ray of the light beam BM emitted from the central semiconductor laser 211 coincides with the optical axis ax1. Spots BMS and incident positions (beam centers) Ca of the nine light beams BM (BM1 to BM9) in the imaginary plane IP1 are therefore arranged in the three-row, three-column regular matrix, as shown in FIG. 4.

Figure 5:
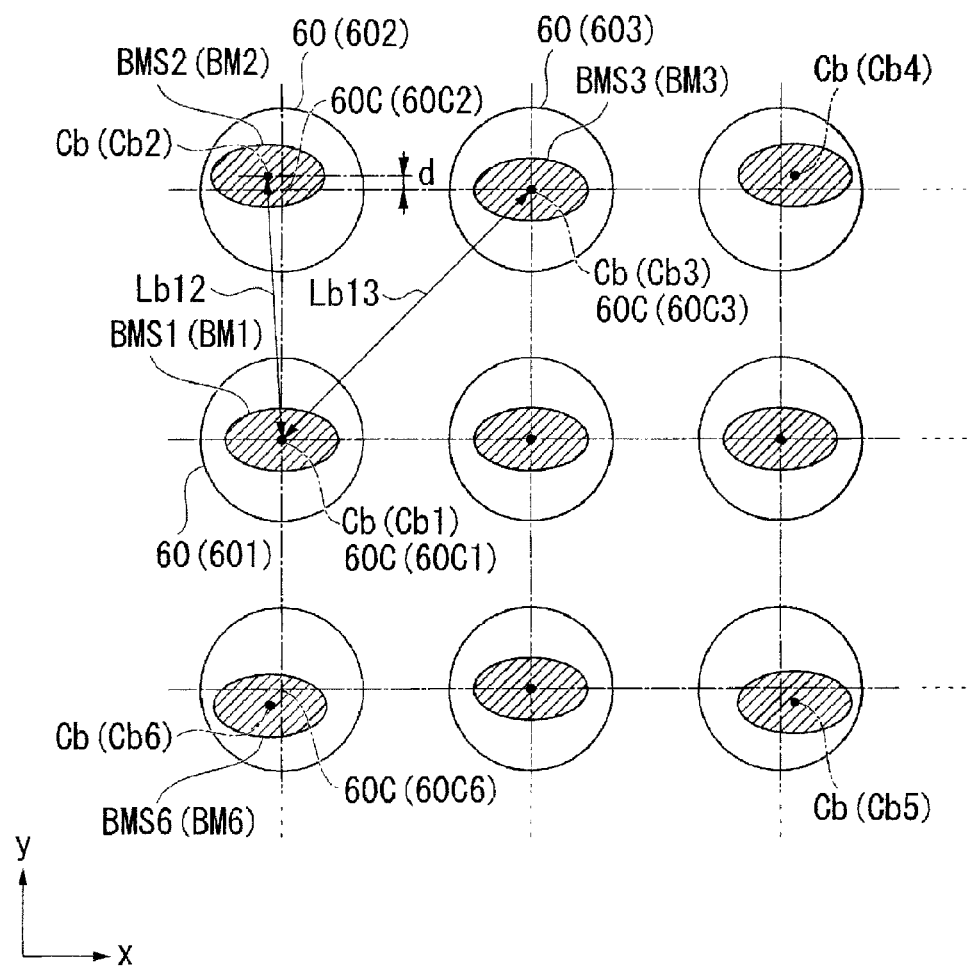
FIG. 5 shows the arrangement of a plurality of light beams in the imaginary plane described in FIG. 3.

FIGS. 3, 4, and 5 show an example in which the light beams BM are arranged so as to form a square grid, but the shape of the grid is not limited to a square.

The lenslets 60 in the first fly-eye lens 24a and the lenslets 61 in the second fly-eye lens 24b, which form the homogenizer system 24, are so arranged that the lens optical axes of the lenslets 60 and the lens optical axes of the lenslets 61 coincide with each other. Therefore, when the light beam BM having exited out of one of the lenslets 60 enters the corresponding lenslet 61, the incident position of the light beam BM coincides with the lens optical axis (not shown) of the lenslet 61. The light beams BM having exited out of the lenslets 61 are therefore superimposed on one another on the phosphor layer 34 based on the effect of the first pickup system 26. The illuminance distribution on the phosphor layer 34 is thus homogenized to some extent. The homogeneity of the illuminance distribution is, however, not sufficient.

Now, consider the positional relationship among the light beam BM1, the light beam BM2, and the light beam BM3 shown in FIG. 4. The light beam BM1, the light beam BM2, and the light beam BM3 correspond to the first light beam, the second light beam, and the third light beam described in the appended claims, respectively.

Reference characters Ca1, Ca2, and Ca3 denote the incident positions where the light beam BM1, the light beam BM2, and the light beam BM3 are incident on the imaginary plane IP1, respectively. The distance between the light beam BM1 and the light beam BM2 on the light incident side of the afocal system 23 is given as a distance La12 between the incident position Ca1 and the incident position Ca2 in the imaginary plane IP1, and the distance between the light beam BM1 and the light beam BM3 on the light incident side of the afocal system 23 is given as a distance La13 between the incident position Ca1 and the incident position Ca3 in the imaginary plane IP1. The ratio of La12 to La13 is called Ra (=La12/La13). Since the plurality of light beams BM form a square grid, Ra is $1/\sqrt{2}$.

FIG. 5 shows the arrangement of the plurality of light beams BM in the imaginary plane IP2. Reference characters BMS1 to BMS6 and Cb1 to Cb6 denote the spots and the incident positions (beam centers) of the light beams BM1 to BM6 in the imaginary plane IP2.

The distance between the light beam BM1 and the light beam BM2 on the light exiting side of the afocal system 23 is given as a distance Lb12 between the incident position Cb1 and the incident position Cb2 in the imaginary plane IP2, and the distance between the light beam BM1 and the light beam BM3 on the light exiting side of the afocal system 23 is given as a distance Lb13 between the incident position Cb1 and the incident position Cb3 in the imaginary plane IP2. The ratio of Lb12 to Lb13 is called Rb (=Lb12/Lb13).

When the afocal system 23 has no aberration for homogenization, the incident positions C of the light beams BM form a square grid also in the imaginary plane IP2, as shown in FIG. 3. In the present embodiment, however, since an aberration for homogenization is added to the afocal system 23, the plurality of incident positions Cb cannot form a square grid in the imaginary plane IP2, as shown in FIG. 5. For example, the incident position Cb2 is shifted from the corresponding point of the square grid in an upper left direction in FIG. 5. The incident position Cb4 is shifted from the corresponding point of the square grid in an upper right direction in FIG. 5. The incident position Cb5 is shifted from the corresponding point of the square grid in a lower right direction in FIG. 5. The incident position Cb6 is shifted from the corresponding point of the square grid in a lower left direction in FIG. 5. The ratio Rb is therefore greater than the ratio Ra.

The afocal system 23 causes the plurality of light beams BM parallel to each other incident thereon to exit in parallel to each other. The plurality of light beams BM are therefore incident on the first fly-eye lens 24a with the positional relationship among the light beams BM in the imaginary plane IP2 maintained.

In FIG. 5, the first fly-eye lens 24a is also so drawn that it is superimposed on the light beams BM. It is noted that the contour of each of the lenslets 60 is actually rectangular but is shown in a circle for ease of illustration. The light beam BM1, the light beam BM2, and the light beam BM3 are incident on a lenslet 601, a lenslet 602, and a lenslet 603, respectively. The lenslet 601, the lenslet 602, and the lenslet 603 have a lens optical axis 60C1, a lens optical axis 60C2, and a lens optical axis 60C3, respectively. The plurality of lenslets 60 is also arranged in a three-row, three-column matrix in correspondence with the arrangement of the semiconductor lasers 211 and form a square grid. Although not shown, the lenslets 61 in the second fly-eye lens 24b are also arranged in a three-row, three-column matrix in correspondence with the plurality of lenslets 60 and form a square grid.

In the lenslet 603, the beam center (incident position) Cb3 coincides with the lens optical axis 60C3. In the lenslet 602, however, the beam center Cb2 is shifted from the corresponding point of the square gird, that is, the lens optical axis 60C2 in an upper left direction in FIG. 5.

When the afocal system 23 has no aberration for homogenization, the beam center Cb2 of the light beam BM2 coincides with the lens optical axis 60C2. Now, a first direction (horizontal direction in FIG. 5) and a second direction (vertical direction in FIG. 5) in which the plurality of lenslets 60 are arranged are called an X-axis direction and a Y-axis direction, respectively. The width d of shift of the beam center Cb2 from the lens optical axis 60C2 in the Y-axis direction is preferably set at a value greater than or equal to one-fourth the light flux width of the light beam BM2 in the Y-axis direction.

The plurality of light beams BM pass through the lenslets 60 in the first fly-eye lens 24a, further pass through the lenslets 61 in the second fly-eye lens 24b, and enter the first pickup system 26 (pickup lens 26a) (see FIG. 2).

The light beam BM3, the beam center Cb3 of which coincides with the lens optical axis 60C3, exits through the center (position of lens optical axis) of the corresponding lenslet 61 in the second fly-eye lens 24b. The light beam BM2, the beam center Cb2 of which is shifted from the lens optical axis 60C2, exits through a position shifted from the center of the corresponding lenslet 61 in the second fly-eye lens 24b.

Figure 6:
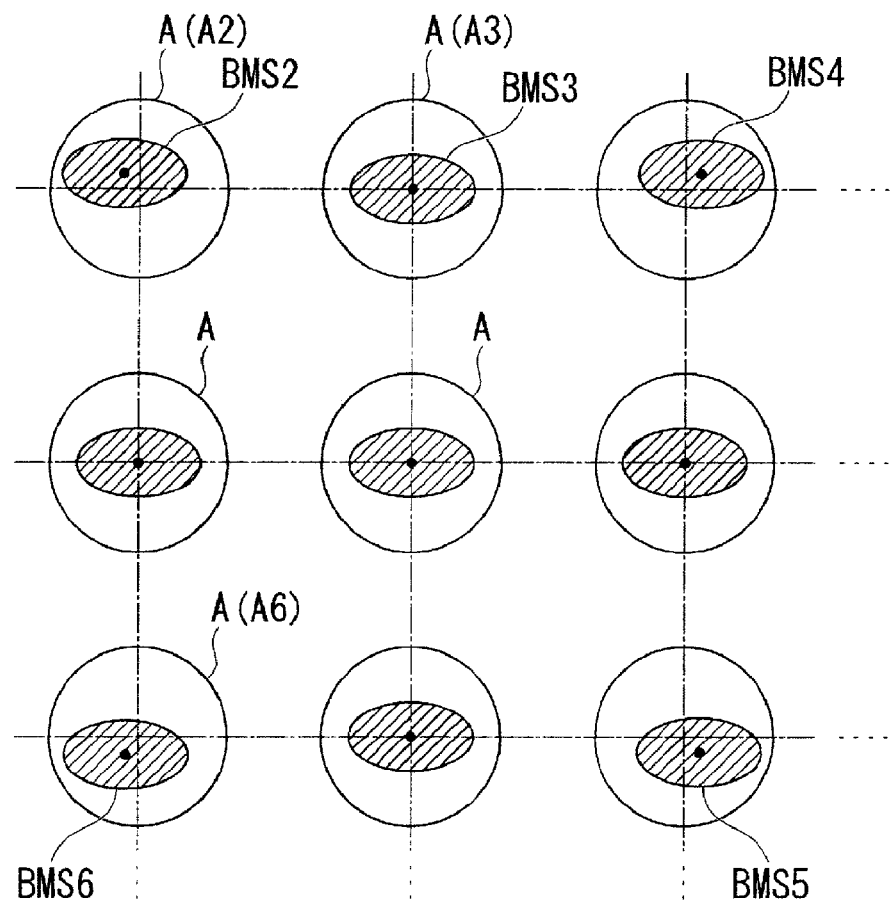
FIG. 6 shows spots formed by the light beams and viewed along a direction parallel to another optical axis.

FIG. 6 shows the spots BMS of the light beams BM that are formed on the light incident surface of the first pickup system 26 (light incident surface of pickup lens 26a), and the spots BMS are viewed along a direction parallel to the optical axis ax2. Spots BMS2, BMS3, and BMS6 are areas illuminated with the light beams BM2, BM3, and BM6, respectively.

FIG. 6 also shows spots A, each of which is formed by parallelized light having passed through the entire area of the corresponding one of the lenslets 61 on the light incident surface of the first pickup system 26. In FIG. 6, each of the spots A is drawn in a circular shape in correspondence with the shape of the lenslets 60 shown in FIG. 5. The shape of the spots A is actually roughly rectangular. A spot A2 corresponds to the lenslet 61 through which the light beam BM2 has passed. A spot A3 corresponds to the lenslet 61 through which the light beam BM3 has passed. A spot A6 corresponds to the lenslet 61 through which the light beam BM6 has passed.

The spot BMS3 formed by the light beam BM3 having exited out of a central portion of the corresponding lenslet 61 is positioned in a central portion of the spot A3, as shown in FIG. 6. On the other hand, the spots BMS2, BMS4, BMS5, and BMS6 formed by the light beams BM2, BM4, BM5, and BM6 having exited through positions shifted from the centers of the corresponding lenslets 61 are shifted from central portions of the corresponding spots A in directions different from one another. As described above, excitation light BL having passed through the homogenizer system 24 contains the light beams BM2, BM3, BM4, BM5, and BM6 that are incident on positions different from one another in the corresponding spots A.

The spots A shown in FIG. 6 are superimposed on one another in roughly the same position on the phosphor layer 34. The areas irradiated with the light beams BM2, BM3, BM4, BM5, and BM6 on the phosphor layer 34 therefore do not completely coincide with one another. The areas irradiated with the light beams BM2, BM4, BM5, and BM6 are shifted from the area irradiated with the light beam BM3 in directions different from one another. The homogeneity of the light intensity distribution of the excitation light BL on the phosphor layer 34 can thus be increased.

Appropriate design of the aberration for homogenization allows the width of shift each of the beam centers Cb from the corresponding lens optical axis 60C in the imaginary plane IP2 to vary in accordance with the distance from the optical axis ax1. Increasing the number of semiconductor lasers 211 therefore allows the homogeneity of the light intensity distribution of the excitation light BL on the phosphor layer 34 to be further increased.

For example, when the light incident surface 23a1 of the convex lens 23a provided in the afocal system 23 is formed of an aspherical surface, setting a peripheral portion of the convex lens 23a to have power smaller than the power of the convex lens 23a in the vicinity of the optical axis allows the shift width d in the imaginary plane IP2 to increase with the distance from the optical axis ax1. On the other hand, setting a peripheral portion of the convex lens 23a to have power greater than the power of the convex lens 23a in the vicinity of the optical axis allows the shift width d in the imaginary plane IP2 to decrease with the distance from the optical axis ax1.

As described above, according to the present embodiment, the homogeneity of the light intensity distribution of the excitation light BL on the phosphor layer 34 can be further improved.

Further, the projector 1 according to the present embodiment, which includes the illumination apparatus 2 described above, allows the fluorescence YL to be efficiently produced and therefore allows display with excellent image quality.

The invention is not necessarily limited to the embodiment described above, and a variety of changes can be made thereto to the extent that the changes do not depart from the substance of the invention.

For example, the positions where the light beams BM are incident on the lenslets 60 may be adjusted, and the shape of each of the light beams BM incident on the lenslets 60 may be distorted at the same time.

For example, the aberration may be so designed that the spots BMS2, BMS3, BMS4, BMS5, and BMS6 have shapes different from one another. In this case, since the areas irradiated with the light beams BM2, BM3, BM4, BM5, and BM6 and formed on the phosphor layer 34 differ from one another in terms of position and shape in the spots A, the light intensity distribution of the excitation light BL can further be homogenized.

Further, the above embodiment has been described with reference to the case where the polarization separation is so performed that the polarization separation element 50A reflects the light beams $BM_{Se}$ toward the fluorescence emitting element 27 and transmits the light beams $BM_P$ toward the reflective diffusion element 30. The invention is, however, not necessarily configured this way. For example, the fluorescence emitting element 27 and the reflective diffusion element 30 may be swapped with each other in terms of position and the polarization separation may be so performed that the polarization separation element 50A transmits the light beams $BM_{Se}$ toward the fluorescence emitting element 27 and reflects the light beams $BM_P$ toward the reflective diffusion element 30.

The peak wavelength of the laser light is not limited to 460 nm. The array light source 21A may include laser light sources that emit laser light beams having peak wavelengths different from one another.

In the embodiment described above, the projector 1 including the three light modulator 4R, 4G, and 4B is presented by way of example. Instead, the invention is also applicable to a projector that uses a single light modulator to display color video images. Further, a digital micromirror device (DMD) may be used as each of the light modulators.

In addition to the above, the shape, the number, the arrangement, the material, and other factors of the variety of components of the illumination apparatus and the projector are not limited to those in the embodiment described above and can be changed as appropriate.

Further, the above embodiment has been described with reference to the case where the illumination apparatus according to the embodiment of the invention is incorporated in a projector, but the invention is not necessarily configured this way. The illumination apparatus according to the embodiment of the invention may be used as a lighting apparatus, a headlight of an automobile, and other components.

The entire disclosure of Japanese Patent Application No. 2014-175470, filed on Aug. 29, 2014 is expressly incorporated by reference herein.

What is claimed is:

1. An illumination apparatus comprising:
    a light source apparatus that outputs a first light beam, a second light beam, and a third light beam;
    an afocal system on which the first light beam, the second light beam, and the third light beam are incident;
    a first fly-eye lens provided in a position downstream of the afocal system;
    a second fly-eye lens provided in a position downstream of the first fly-eye lens;
    a light convergence system provided in a position downstream of the second fly-eye lens; and
    a phosphor layer which is provided in a position downstream of the light convergence system and on which the first light beam, the second light beam, and the third light beam are incident via the light convergence system,
    wherein a ratio R is defined to be a ratio between the distance between the first light beam and the second light beam and the distance between the first light beam and the third light beam, the afocal system is so configured that the ratio R on the light exiting side of the afocal system differs from the ratio R on the light incident side of the afocal system, and the afocal system includes a convex lens having an aspherical surface.

2. A projector comprising:
    an illumination apparatus that outputs illumination light;
    a light modulator that modulates the illumination light in accordance with image information to form image light; and
    a projection system that projects the image light,
    wherein the illumination apparatus is the illumination apparatus according to claim 1.

* * * * *